United States Patent
Mathur et al.

(10) Patent No.: US 6,581,072 B1
(45) Date of Patent: Jun. 17, 2003

(54) TECHNIQUES FOR IDENTIFYING AND ACCESSING INFORMATION OF INTEREST TO A USER IN A NETWORK ENVIRONMENT WITHOUT COMPROMISING THE USER'S PRIVACY

(76) Inventors: Rakesh Mathur, 517 W. Highland Dr., Seattle, WA (US) 98119; Ramesh Subramonian, 1978 Edgewood Dr., Palo Alto, CA (US) 94303; Ramana Venkata, 2336 California St. #9, Mountain View, CA (US) 95040; Pangal P. Nayak, 801 Talisman Dr., Palo Alto, CA (US) 94303; Joy A. Thomas, 492 Nuestra Ave., Sunnyvale, CA (US) 95086

( * ) Notice: Subject to any disclaimer, the term of this patent is extended or adjusted under 35 U.S.C. 154(b) by 7 days.

(21) Appl. No.: 09/861,463

(22) Filed: May 17, 2001

Related U.S. Application Data (60) Provisional application No. 60/206,190, filed on May 22, 2000, and provisional application No. 60/205,938, filed on May 18, 2000.

(51) Int. Cl.[7] .................................................. G06F 7/00
(52) U.S. Cl. ........................... 707/104.1; 707/3; 705/26
(58) Field of Search ..................... 707/104.1, 3; 709/26

(56) References Cited

U.S. PATENT DOCUMENTS 6,119,101 A * 9/2000 Peckover ..................... 705/26

* cited by examiner

*Primary Examiner*—Charles Rones
(74) *Attorney, Agent, or Firm*—Townsend and Townsend and Crew LLP (57) ABSTRACT

Techniques for identifying and accessing documents (e.g., web pages) of interest to a user in a network environment without compromising the user's privacy. A user system receives index information comprising information related to documents stored in a network environment. The index information is then used to identify and access documents of interest to the user. The identification of documents of interest to the user is performed on the user system thus obviating the need to provide any information to search engines executing on remote servers. The present invention preserves user privacy by controlling and minimizing the communication and collection of user-related information from the user system. Merely by way of example, the present invention allows users to identify and access web pages from web servers coupled to a communication network such as the Internet without compromising user privacy.

45 Claims, 5 Drawing Sheets

┌─ 402                                          406    ┌─ 404
                                                 │
sportsillustrated.cnn.com/baseball/mlb/news/2001/05/07/cordova_indians_ap   Cleveland Indians,Major
League Baseball, CNNSI:Cordova flourishing in potent Cleveland lineup sportsillustrated.cnn.com/baseball/mlb/news/2001/05/07/lima_suspended_ap   Major League Baseball,
    CNNSI:Lima suspended five games for hitting Payton sportsillustrated.cnn.com/baseball/mlb/news/2001/05/08/al_beat/    Minnesota Twins,Boston Red
Sox,Cleveland Indians,New York Yankees,Major League Baseball,    CNNSI:AL Beat: Streaking Indians
closing on Twins in AL Central sportsillustrated.cnn.com/baseball/mlb/news/2001/05/08/kapler_streak_ap    Texas Rangers,Major
League Baseball, CNNSI:Rangers' Kapler rolling after returning from DL sportsillustrated.cnn.com/baseball/mlb/news/2001/05/08/mets_payton   Major League Baseball,
    CNNSI:Mets place Payton on DL, call up Escobar sportsillustrated.cnn.com/baseball/mlb/news/2001/05/08/yankees_twins_ap    Minnesota Twins,New
York Yankees,Major League Baseball,    CNNSI:Twins' Milton tosses four-hit shutout at Yankees sportsillustrated.cnn.com/basketball/college/news/2001/05/05/butler_lickliter_apCollege Basketball,
    CNNSI:Butler promotes assistant Lickliter to replace Matta sportsillustrated.cnn.com/basketball/college/news/2001/05/05/kentucky_pro_ap Kentucky Men's
Basketball,College Basketball,    CNNSI:Kentucky's Prince, Bogans to test draft waters sportsillustrated.cnn.com/basketball/college/news/2001/05/05/lotz_obit_ap    College Basketball,
    CNNSI:Former Gators coach, UNC aide Lotz dies at 64 sportsillustrated.cnn.com/basketball/college/news/2001/05/06/clancy_nba_ap    College Basketball,
    CNNSI:Report: USC's Clancy to enter NBA Draft sportsillustrated.cnn.com/basketball/college/news/2001/05/06/gw_hobbs_ap    College Basketball,
    CNNSI:George Washington hires UConn assistant Hobbs

*Fig. 4*

Fig. 5

TECHNIQUES FOR IDENTIFYING AND ACCESSING INFORMATION OF INTEREST TO A USER IN A NETWORK ENVIRONMENT WITHOUT COMPROMISING THE USER'S PRIVACY

CROSS-REFERENCES TO RELATED APPLICATIONS

This application claims priority from the following applications, the entire disclosures of which are herein incorporated by reference for all purposes:

(1) U.S. Provisional Patent Application No. 60/206,190, entitled "SYSTEM AND METHOD FOR PROVIDING INFORMATION TO USERS IN A NETWORK ENVIRONMENT WITHOUT COMPROMISING USER PRIVACY" filed May 22, 2000; and (2) U.S. Provisional Patent Application No. 60/205,938, entitled "SYSTEM AND METHOD FOR CREATING VIRTUAL COMMUNITIES WHILE PRESERVING THE PRIVACY OF USERS IN THE VIRTUAL COMMUNITY" filed May 18, 2000.

The present application also incorporates herein by reference for all purposes the entire disclosures of the following applications which are filed concurrently with this application:

(1) U.S. patent application Ser. No. 09/861,082 (currently pending), entitled "TECHNIQUES FOR IDENTIFYING VIRTUAL USER GROUPS IN A NETWORK ENVIRONMENT WITHOUT COMPROMISING USER PRIVACY";

(2) U.S. patent application Ser. No. 09/861,471 (currently pending), entitled "TECHNIQUES FOR JOINING VIRTUAL USER GROUPS IN A NETWORK ENVIRONMENT AND RECEIVING INFORMATION RELATED TO THE VIRTUAL USER GROUPS WITHOUT COMPROMISING USER PRIVACY"; and (3) U.S. patent application Ser. No. 09/861,094 (currently pending), entitled "TECHNIQUES FOR SHARING CONTENT INFORMATION WITH MEMBERS OF A VIRTUAL USER GROUP IN A NETWORK ENVIRONMENT WITHOUT COMPROMISING USER PRIVACY".

BACKGROUND OF THE INVENTION

The present invention relates generally to identifying and accessing information stored by communication and information networks. More particularly, the present invention describes techniques for identifying and accessing information of interest to a use while preserving the privacy of the user.

With the widespread use of computers, an expanding telecommunication network, and the rising popularity of communication networks such as the Internet, an increasing amount of information is contained in documents stored by computer systems coupled to the communication networks. Users can access these documents by using computer systems coupled to the communication networks. For example, a user can browse the Internet and access web pages stored by servers coupled to the Internet.

Computer systems connected to communication networks such as the Internet can generally be classified as "clients" or "servers" depending on the role the computer systems play with respect to requesting information or storing/providing information. Computers systems which are used by users to access information are typically called "client" computers. Computer systems which store information and provide the information to client computers are usually referred to as "server" systems. Accordingly, server systems are responsible for receiving information requests from client systems, performing processing required to satisfy the requests, and for forwarding the results/information corresponding to the information requests back to the requesting client systems. The processing required to satisfy the client request may be performed by a single server system or may alternatively be delegated to other servers connected to the communication network, such as the Internet. It should be apparent that a particular computer system may function both as a server and a client.

In the World Wide Web ("Web") environment, information resources are typically stored in the form of hypertext documents called "web pages" which can be accessed and read by users of the Web. A web page may incorporate any combination of text, graphics, audio and video content, software programs, and other data. Web pages may also contain hypertext links to other web pages. Web pages are typically stored on web servers or content servers coupled to the Internet. Each web page is uniquely identified by an address called a Uniform Resource Locator (URL) that enables users to access the web page.

Users typically access web pages using a program called a "web browser" which generally executes on a client computer coupled to the Internet. The web browser is a type of client application that enables users to select, retrieve, and perceive information contained in web pages. Examples of browsers include the Internet Explorer browser program provided by Microsoft Corporation, the Netscape Navigator browser provided by Netscape Corporation, and others. Users generally access web pages by providing URL information to the browser, either directly or indirectly, and the browser responds by retrieving the web page corresponding to the user-provided URL from the Internet. The retrieved web page is then displayed to the requesting user on the client computer.

Due to the vast volume of information available via communication networks such as the Internet, it is becoming increasingly difficult for a user to identify documents which contain information of interest to the user or documents which are relevant to the user. For example, in a Web environment, a user may be interested in locating web pages containing information on a particular topic, e.g., Thai cooking. In a Web environment, the user may locate the relevant web pages by accessing one or more web servers, and browsing through web pages stored by the one or more web servers to identify web pages containing information related to Thai cooking. However, searching for web pages in this manner is a non-trivial task because the user does not typically know which web servers store information of interest to the user. Further, since each web server may store a vast number of web pages, in order to find web pages containing information of interest to the user (e.g., web pages containing information related to Thai cooking), the user is often forced to sift through large volumes of information and web pages, most of which are irrelevant to the user. As a result, the task of identifying relevant web pages can be very time consuming and frustrating to the user, and may not yield the results desired by the user.

In order to alleviate the above problem, most users generally use programs which help identify relevant documents from a large pool of documents. These programs are commonly referred to as search engines and are generally executed by servers coupled to the communication network. Examples of search engines in the Internet environment include search engines provided by Yahoo, Google, Lycos, Excite, Altavista, and the like which enable users to identify web pages of interest to the user.

Search engines typically use a crawler or a spider to find information about documents stored by the communication network which are accessible to the search engine and which can be located and searched using the search engine. For example, in a Web environment, a crawler may access web pages and URL links to other web pages embedded in the web pages, and so on. For each web page accessed by the crawler, the crawler discovers information about the web page including the URL of the web page, the contents of the web page, the web server storing the web page, and the like. The information collected by a crawler is usually stored by the server providing the search engine in the form of an index.

An index built by a search engine generally facilitates identification of documents based on criteria related to the documents or their contents. The criteria may include words occurring in the documents, concepts or topics to which the documents relate, subject matter of the documents, and the like. The structure of an index may vary based on the search engine. For example, in a Web environment, a particular search engine may prepare an index mapping words found in a plurality of web pages to the URLs corresponding to the web pages. In another index, the information may be indexed based on titles, headings, subheadings, etc. found in the web pages, or based upon concepts and topics extracted from the web pages contents, and so on. In general, indices are built in a way that facilitates the identification of the documents and/or locations of the documents. In a Web environment, the locations of documents may be identified by URLs corresponding to the web pages.

A search engine also provides a search tool which allows users to identify documents of interest using information stored in the index generated by the search engine. In order to identify documents of interest, a user generally configures a query using a client computer. The query may contain query terms which describe, for example, a topic or concept for which the user is interested in finding more information. For example, if the user is interested in finding information on Thai cooking, the query terms may include the words "Thai" and "cooking."

The user-configured query is then communicated from the user's client computer to a remote server system executing a search engine. Upon receiving the search query, the search engine executing on the remote server identifies documents (or locations of the documents) which match or satisfy the user query based upon information stored in the index used by the search engine. The search engine may use various techniques to determine documents which are relevant to the search query received from the user's client system. Information identifying the relevant documents or their locations determined by the search engine is then communicated from the search engine server to the user's client computer. The user may then use the information received from the search engine to access one or more of the relevant documents.

Some search engines also perform searches implicitly without receiving specific user input based on the contents of documents (e.g., web pages) viewed by the user. These search engines use the contents of the document being browsed/viewed by the user as a search query which is communicated from the user computer to the search engine server. Based on the contents of the document being viewed by the user and based upon index information used by the search engine, the search engine identifies documents of interest to the user. Information related to the documents identified by the search engine is then communicated to the user system. The information may then be presented to the user via a pop-up screen which appears on an output device of the user's computer system. For example, in a Web environment, a window may appear on the user's display device listing URLs corresponding to documents identified by the search engine to be of interest to the user based on the contents of the documents presently viewed by the user. Examples of companies which provide such implicit search engines include Nano (http://www.nano.com/), Kenjin (http://www.autonomy.com), Third Voice (http://www.thirdvoice.com/), Flyswat (http://www.flyswat.com), Gurunet (http://www.gurunet.com), Annotate (http://www.annotate.net/) and Alexa (http://www.alexa.com/).

In a Web environment, the relevant documents may be web pages which may be identified by URLs. Accordingly, the search engine may communicate a list of URLs of interest to the user to the user's client system in response to the user query. The user may then select one or more URLs from the list of URLs and access web pages corresponding to the selected URLs. When the user selects a URL, the URL request is sent to a web server storing the web page corresponding to the URL, and the web server responds by communicating the requested web page to the user's client computer system. The server executing the search engine may act as a conduit forwarding the selected web page received from the web server to the user client computer system.

While conventional search engines simplify the process of identifying documents containing information of interest to a user, they also compromise the user's privacy. This is because conventional search engine servers frequently track and/or mine the user's browsing activities and track information provided by the user to the search engine. For example, several conventional search engines mine, without the user's permission, information contained in user search queries (which may contain information of a sensitive and private nature) provided to the search engines. Several conventional search engines also track the contents of documents (e.g. web pages) accessed by the user using the search engine. For example, in a Web environment, conventional search engines track the web pages accessed by the user, the content of the web pages, transactions performed by the user using the web pages, and other like information without the user's permission.

The information mined or tracked by conventional search engines is then used to ascertain information about the user's interests, likes/dislikes, the user's shopping preferences, information related to the user's use of the Internet, and other information related to the user and the user's behavior. Since users generally have a tendency to use a particular search engine to perform searching, over a period of time, the particular search engine is capable of building a pretty detailed profile of the user and the user's behavior.

The user information collected by the search engines and the user profile information built by the search engines, which may be sensitive in nature and contain confidential information, may then be distributed or even sold by providers of search engines to entities such as advertising agencies, government agencies, insurance companies, business entities, and the like. This may result in the user being subjected to unsolicited Spam mail messages, unwelcome advertisements, credit card fraud, mail fraud, banking fraud, and other unwelcome activities. As a result, the use of a conventional search engine executing on a remote server can severely compromise a user's privacy and security. Further, since the information collected by the search engines is typically stored on a server system which is located at a remote location from the user's computer system, the user has very little control on the collection and dissemination of the information.

In light of the above, there is a need for techniques which allow a user to identify and access documents of interest to the user (e.g., web pages in a Web environment) without compromising the user's privacy and security.

SUMMARY OF THE INVENTION

According to the present invention techniques are provided which allow a user to identify and access documents (e.g., web pages) of interest to the user in a network environment without compromising the user's privacy. More particularly, according to an embodiment of the present invention, the user system receives index information which is used to identify documents of interest to the user at the user system itself without having to have to provide any user-related information to search engines executing on remote servers. The present invention preserves user privacy by controlling and minimizing the communication and collection of user-related information from user system. Merely by way of example, the present invention allows users to identify and access web pages from web servers coupled to a communication network such as the Internet without compromising user privacy.

According to an embodiment of the present invention, techniques are provided which enable a user system to access a first document from a plurality of documents stored by a plurality of web servers. In this embodiment, an index server determines index information to be communicated to the user system, the index information comprising information identifying the plurality of documents stored by the plurality of web servers and information related to the contents of the plurality of documents. The index server communicates the index information to the user system. The user system is configured to identify a first set of documents from the plurality of documents using the index information received from the index server, the first set of documents including the first document, to receive a signal indicating selection of the first document from the first set of documents, and responsive to the signal, to access the selected first document from a web server storing the first document. According to the teachings of the present invention, the user system is configured to identify the first set of documents substantially free from interaction with the index server and the plurality of web servers.

According to another embodiment, the present invention provides techniques for identifying and accessing a first document from a plurality of documents stored by a plurality of servers using a data processing system. In this embodiment, the data processing system is configured to receive index information from an index server, the index information comprising information identifying the plurality of documents stored by the plurality of servers and information related to the contents of the plurality of documents. The data processing system is configured to identify a first set of documents from the plurality of documents using the index information received from the index server, the first set of documents including the first document. According to the teachings of the present invention, the data processing system is configured to identify the first set of documents substantially free from any interaction with the plurality of servers and the index server. The data processing system is also configured to receive a signal indicating selection of the first document from the first set of documents, and to access the selected first document from a server storing the first document in response to the signal.

Various additional objects, features and advantages of the present invention can be more fully appreciated with reference to the detailed description and accompanying drawings that follow.

DESCRIPTION OF THE SPECIFIC EMBODIMENTS

According to the present invention techniques are provided which allow a user to identify and access documents (e.g., web pages) of interest to the user in a network environment without compromising the user's privacy. More particularly, according to an embodiment of the present invention, the user can identify and access documents of interest to the user at the user system itself without having to have to provide user-related information to search engines executing on remote servers. The present invention preserves user privacy by controlling and minimizing the tracking and communication of user-related information from the user system. Techniques according to the present invention allow the user to control the dissemination of information related to documents and their contents accessed by the user. Merely by way of example, the present invention allows a user to identify web pages of interest to the user and to access the relevant web pages from web servers coupled to a communication network such as the Internet without compromising user privacy.

The invention has been described below using a Web-based embodiment of the present invention which is used to identify and access web pages of interest to a user. It should however be apparent that the present invention is not restricted to the Web environment, and may also be used in other network environments such as an intranet, a WAN, a wireless network, and the like. Additionally, the present invention can be used to identify and access other types of documents besides web pages.

Figure 1:
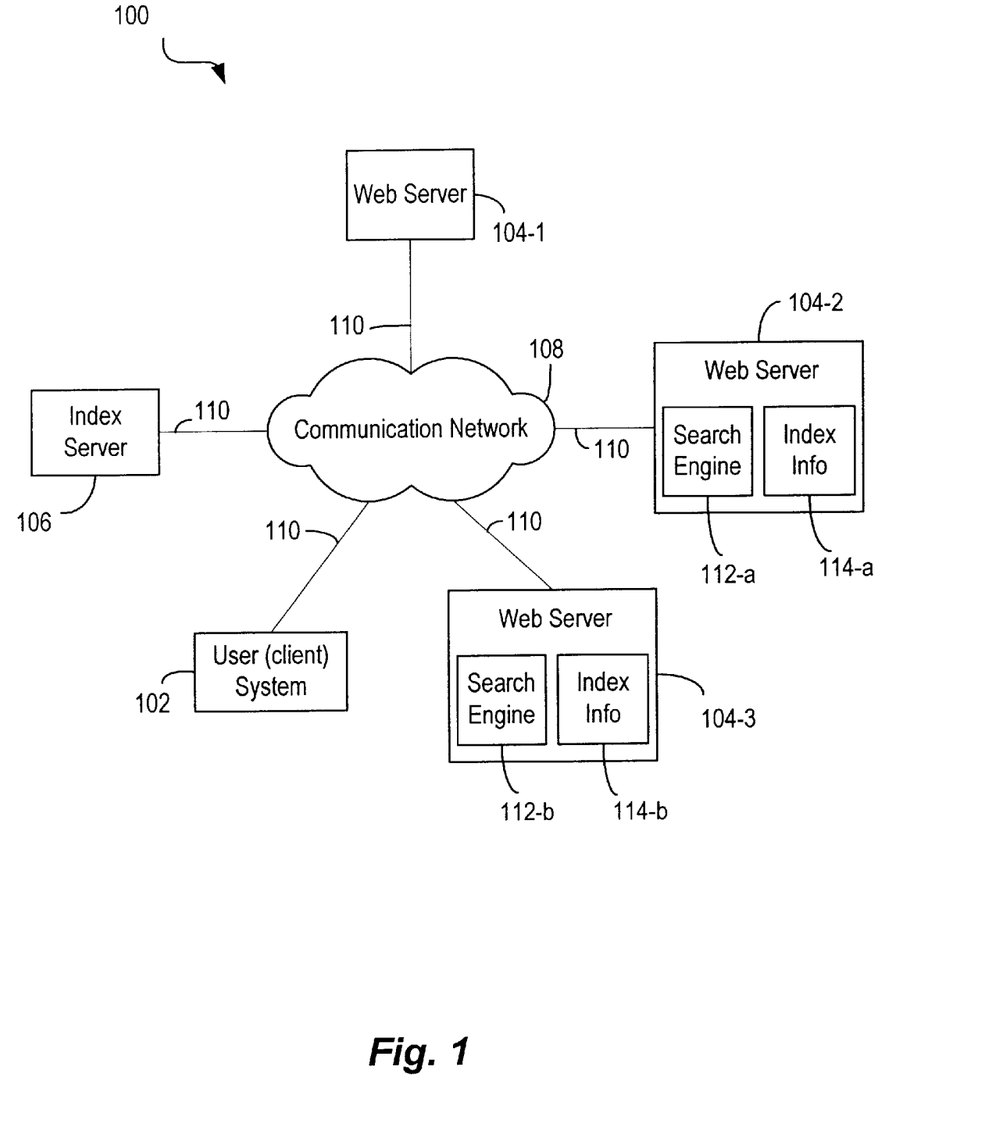
FIG. 1 is a simplified block diagram of a distributed computer network which may incorporate an embodiment of the present invention.

FIG. 1 is a simplified block diagram of a distributed computer network 100 which may incorporate an embodiment of the present invention. As shown, computer network 100 comprises a number of computer systems coupled to a communication network 108 via communication links 110. The computer systems depicted in FIG. 1 include a user computer system 102, web server systems 104-1, 104-2, and 104-3, and an index server 106. Distributed computer network 100 depicted in FIG. 1 is merely illustrative of an embodiment incorporating the present invention and does not limit the scope of the invention as recited in the claims. One of ordinary skill in the art would recognize other variations, modifications, and alternatives. For example, a plurality of user systems 102 may be coupled to communication network 108. These user systems may be coupled directly to communication system 108 (e.g. user system 102 depicted in FIG. 1), or may alternatively be coupled to the communication network via an access provider (not shown) or via some other server system.

Communication network 108 provides a mechanism allowing the various components of computer network 100 to communicate and exchange information with each other. Communication network 108 may itself be comprised of many interconnected computer systems and communication links. While in one embodiment, communication network 108 is the Internet, in other embodiments, communication network 108 may be any suitable communication network including a local area network (LAN), a wide area network (WAN), a wireless network, a intranet, a private network, a public network, a switched network, combinations thereof, and the like.

Communication links 110 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, extensible markup language (XML), wireless application protocol (WAP), vendor-specific protocols, customized protocols, and others.

According to an embodiment of the present invention, user system 102 can be used by users to identify and access documents stored by the various computer systems coupled to communication network 108. In a Web environment, users may use user systems 102 to access web pages and other information resources stored by servers, such as web servers 104, coupled to communication network 108. As described above, users generally use a browser program executing on user system 102 to identify, access, and view web pages and other information stored by computer systems coupled to communication network 108. User system 102 generally functions as a client requesting information from the servers coupled to communication network 108.

Web server systems 104 store information resources and documents which may be accessed by user systems 102 coupled to communication network 108. In a Web environment, the documents may be stored in the form of web pages which can be accessed by users using user systems 102. One or more of the web servers (e.g., servers 104-2 and 104-3 depicted in FIG. 1) may also provide conventional search engines 112 which allow users to identify documents of interest to users. Servers which provide search engines may also store indices 114 which are used by the search engines to identify documents relevant to the user.

Index server 106 is configured to communicate index information to user system 102. According to an embodiment of the present invention, the index information communicated by index server 106 to user system 102 includes indices received by index server 106 from one or more web servers 104 coupled to communication network 108. For example, for the distributed system depicted in FIG. 1, index server 106 may receive index information 114-*a* from server 104-2 and index information 114-*b* from web server 104-3, and the index information communicated by index server 106 to user system 102 may include index information 114-*a* and 114-*b*. According to another embodiment of the present invention, index server 106 may process the indices information received from the web servers before communicating the information to user system 102. In yet other embodiments of the present invention, index server 106 may itself be configured to generate an index for information stored by computer systems coupled to communication network 108. For example, index server 106 may use spiders and crawlers to collect information related to documents accessible via communication network 108 and build an index based on the collected information. Index server 106 may then communicate the generated index to user system 102.

In alternative embodiments of the present invention, the index information may be directly communicated from web servers 104 to user system 102. It should be apparent that a particular computer system may function both as a web server 104 and as an index server 106. Further information related to the functions performed by computer systems depicted in FIG. 1 is described below in conjunction with flowchart 300 depicted in FIG. 3.

The index information communicated to users system 102 comprises information about documents accessible via communication network 108. For a particular document, the index information may include information identifying the document (e.g. title of the document, etc.), information identifying the location of the document (e.g. information about web servers storing the document), information related to the contents of the document (e.g. information about concepts discussed by the document, or a topic or subject to which the document relates), and other information related to the document. The index information is generally organized in a manner which facilitates identification of documents and/or locations of the documents based on criteria related to the documents and/or their contents. The criteria may include words occurring in the documents, concepts or topics discussed by the documents, contents of the documents, servers storing the documents, and other attributes of the documents.

Figure 2:
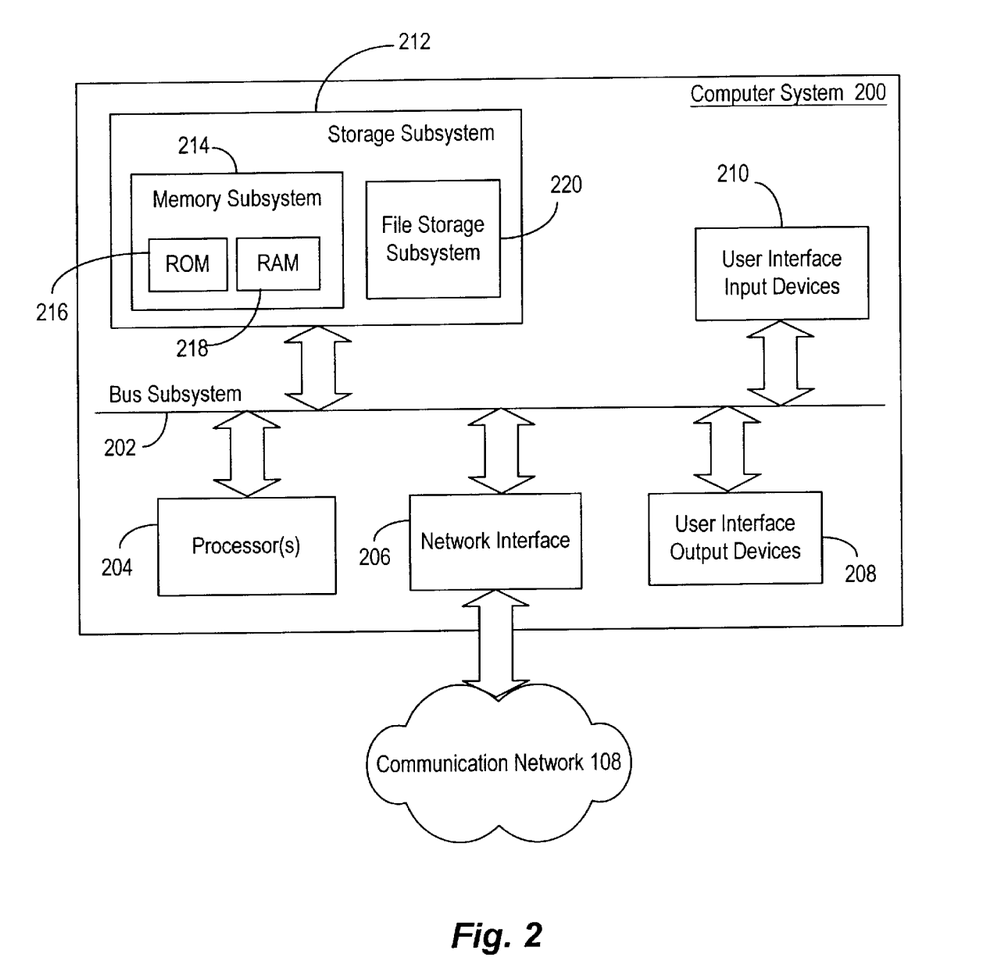
FIG. 2 is a simplified block diagram of a computer system according to an embodiment of the present invention.

FIG. 2 is a simplified block diagram of a computer system 200 according to an embodiment of the present invention. Computer system 200 may be used as a user system 102, an index server system 106, a web server 104, and other systems coupled to communication network 108. As shown in FIG. 2, computer system 200 includes at least one processor 204, which communicates with a number of peripheral devices via bus subsystem 202. These peripheral devices may include a storage subsystem 212, comprising a memory subsystem 214 and a file storage subsystem 220, user interface input devices 210, user interface output devices 208, and a network interface subsystem 206. The input and output devices allow user interaction with computer system 200. A user may be a human user, a device, a process, another computer, and the like. Network interface subsystem 206 provides an interface to communication network 108 and may be coupled via the network to corresponding interface devices in other computer systems.

User interface input devices 210 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information into computer system 200 or to communication networks coupled to computer system 200.

User interface output devices 208 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 200.

Storage subsystem 212 may be configured to store the basic programming and data constructs that provide the functionality of the computer system and of the present invention. For example, according to an embodiment of the present invention, software modules implementing the functionality of the present invention may be stored in storage subsystem 212. These software modules may be executed by processor(s) 204 of computer system 200. In a distributed environment, the software modules may be stored on a plurality of computer systems and executed by processors of the plurality of computer systems. Storage subsystem 212 may also provide a repository for storing various databases which may be used to store information according to the teachings of the present invention. Storage subsystem 212 may comprise memory subsystem 214 and file storage subsystem 220.

Memory subsystem 214 may include a number of memories including a main random access memory (RAM) 218 for storage of instructions and data during program execution and a read only memory (ROM) 216 in which fixed instructions are stored. File storage subsystem 220 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site coupled to communication network 108. Information stored according to the teachings of the present invention may also be stored by file storage subsystem 220.

Bus subsystem 202 provides a mechanism for letting the various components and subsystems of computer system 200 communicate with each other as intended. The various subsystems and components of computer system 200 need not be at the same physical location but may be distributed at various locations within distributed network 100. Although bus subsystem 202 is shown schematically as a single bus, alternative embodiments of the bus subsystem may utilize multiple busses.

Computer system 200 itself can be of varying types including a personal computer, a portable computer, a workstation, a computer terminal, a network computer, a mainframe, a kiosk, a personal data assistant (PDA), a communication device such as a cell phone, or any other data processing system. Due to the ever-changing nature of computers and networks, the description of computer system 200 depicted in FIG. 2 is intended only as a specific example for purposes of illustrating the preferred embodiment of the computer system. Many other configurations of a computer system are possible having more or fewer components than the computer system depicted in FIG. 2. Computer system 200 may function as a client or a server, or combinations thereof.

Figure 3:
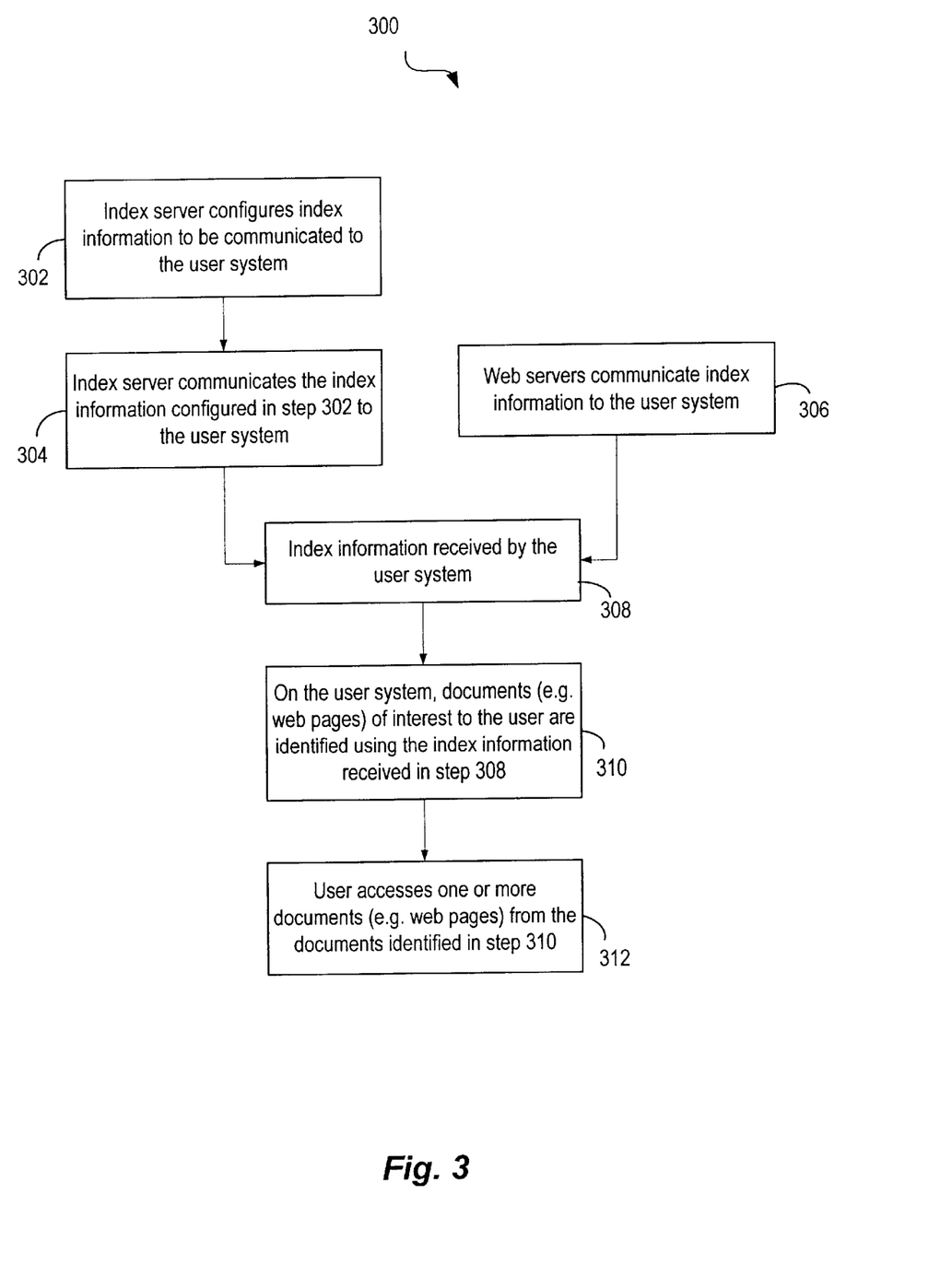
FIG. 3 is a simplified high-level flowchart depicting processing performed according to an embodiment of the present invention to identify and access documents of interest to a user without compromising the user's privacy.

FIG. 3 is a simplified high-level flowchart 300 depicting processing performed according to an embodiment of the present invention to identify and access documents (e.g., web pages in a Web environment) of interest to a user without compromising the user's privacy. Although FIG. 3 and the associated description describes a process for identifying and accessing web pages of interest to the user, it should be apparent that the process can also be used to identify and access other types of documents e.g., documents created using application programs such as word processors, graphics applications, etc., accessible via a network environment. Flowchart 300 depicted in FIG. 3 is merely illustrative of an embodiment incorporating the present invention and does not limit the scope of the invention as recited in the claims. One of ordinary skill in the art would recognize other variations, modifications, and alternatives.

As depicted in FIG. 3, index server 106 configures index information to be communicated to user system 102 (step 302). Index server 106 may use various techniques to configure the index information. According to an embodiment of the present invention, index server 106 configures the index information based on indices information received from one or more web servers coupled to communication network 108. For example, for the distributed system depicted in FIG. 1, index server 106 may receive index information 114-*a* from server 104-2 and index information 114-*b* from web server 104-3, and index server 106 may configure or build the index information to be communicated to user system 102 based on index information 114-*a* and 114-*b*.

According to an embodiment of the present invention, web servers 104 may communicate the indices information to index server 106 in response to requests received from index server 106. In alternative embodiments, web servers 104 may be configured to communicate indices information to index server 106 on a periodic basis. The length of the period may be user configurable. Indices information may be communicated to index server 106 at regular time intervals to ensure that index server 106 has the latest snapshot of documents stored by the web servers. Various other techniques may also be used to ensure that index server 106 has up-to-date information.

According to an embodiment of the present invention, index server 106 may process the indices information received from the web servers before communicating the information to user system 102. As part of the processing, index server 106 may combine information contained in the various indices received from the various web servers to form the index information to be communicated to user system 102.

In other embodiments of the present invention, index server 106 may itself generate or configure an index for documents stored by computer systems coupled to communication network 108. For example, index server 106 may use spiders, crawlers, etc. to collect information related to web pages accessible via communication network 108. Index server 106 may then build an index based on the documents related information collected by the spiders, crawlers, etc.

Since the size of the index information can be quite large, according to an embodiment of the present invention, index server 106 performs processing to reduce the size of the index information to be communicated to user system 102. As part of this processing, index server 106 may use various filters reduce the size of the index information to be communicated to user system 102. Index server 106 may also use various data compression techniques to reduce the size of the index information communicated to user system 102. According to an embodiment of the present invention, index server 106 may be configured to communicate index information to user system 102 in an incremental manner, such that only new or changed index information (a delta from the previously communicated index information) is communicated to user system 102.

According to an embodiment of the present invention, index server 106 may be configured to communicate only a portion (referred to as a "partial index information") of the index information received by or configured by index server 106 to user system 102. Index server 106 may determine the contents of the partial index information to be communicated to user system 102 based on criteria provided to index server 106. According to an embodiment of the present invention, the criteria is user-configurable. The user configured criteria is generally abstract and generic enough that user privacy is not compromised. For example, a particular user may only be interested in documents related to Sports, and accordingly may indicate to index server 106 that the user system used by the user should only receive index information related to "Sports" related documents. In this scenario, index server 106 may extract sports-related information from the index information received by or configured by index server 106, and communicate only the sports-related index information to user system 102 in step 304.

Index server 106 then communicates the index information configured in step 302 to user system 102 (step 304). The index information comprises information about web pages accessible via communication network 108. The index information may include information identifying the web pages, information identifying the location of the web pages (e.g. URLs corresponding to the web pages, information about servers storing the web pages, etc.), information related to the contents of the web pages (e.g. concepts/topics/subjects discussed by the web pages), and other information related to the web pages. The index information is generally organized in a manner which facilitates identification of web pages and/or locations of the web pages based on criteria related to the web pages and/or their contents. The criteria may include words occurring in the web pages, concepts or topics discussed by the web pages, contents of the web pages, servers storing the web pages, and other attributes of the web pages.

According to an embodiment of the present invention, index server 106 may communicate the index information to user system 102 on a periodic basis. The time period between transfers may be user configurable. Index information may be communicated to user system 102 at regular time intervals to ensure that the user system has the latest snapshot of the documents stored by the servers. Various other techniques may also be used to ensure that user system 102 has up-to-date information about the web pages and documents stored by web servers 104. In an alternative embodiment, index server 106 may communicate the index information to user system 102 in response to information requests received from user system 102. For example, user system 102 may send a signal to index server 106 requesting the index server to download the index information to the requesting user system.

In alternative embodiments of the present invention, user system 102 may also receive index information directly from web servers 104 which provide search engines (step 306). Web servers 104 may communicate the indices information to user system 102 on a periodic basis. The time period between transfers may be user configurable. In alternative embodiments, web servers 104 may communicate the index information to user system 102 in response to requests received from user system 102.

Figure 4:
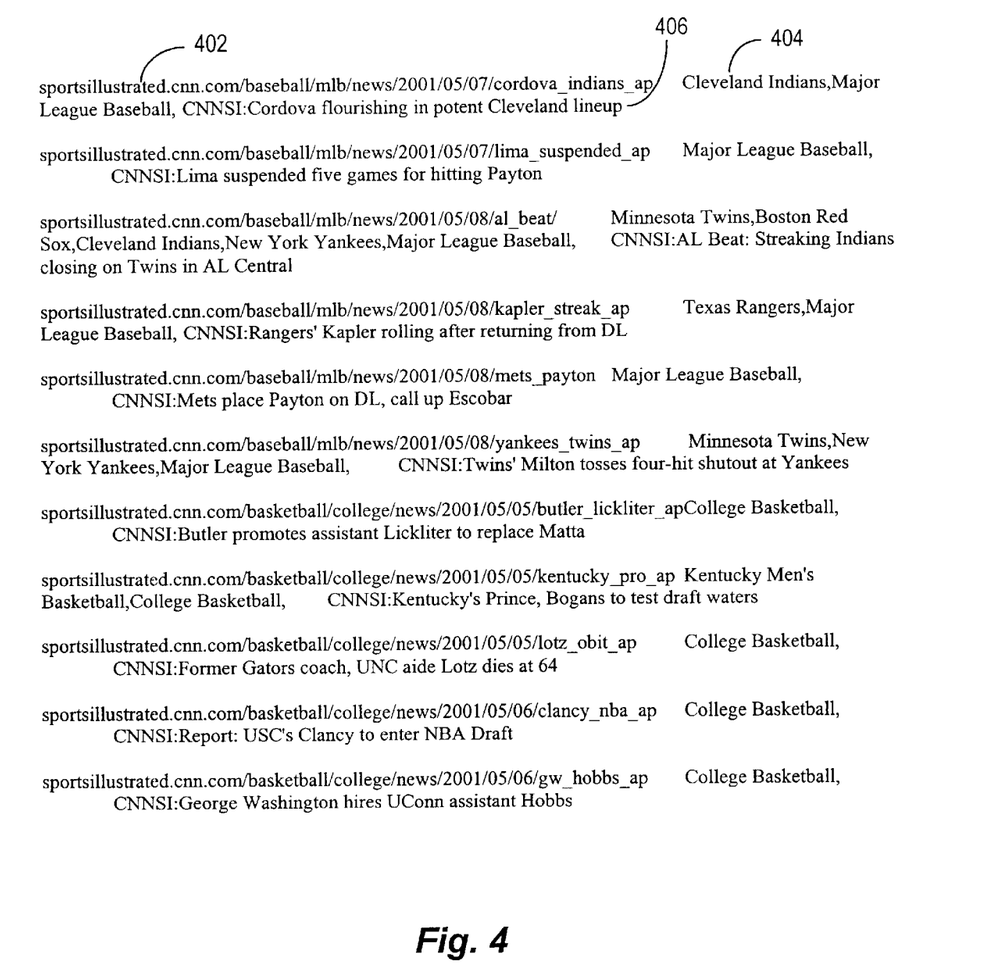
FIG. 4 depicts a portion of index information that may be communicated from an index server to a user system according to an embodiment of the present invention.

FIG. 4 depicts a portion of index information that may be communicated from index server 106 (or from web servers 104 which provide search engines) to user system 102 according to an embodiment of the present invention. The index information depicted in FIG. 4 comprises information related to a plurality of documents stored by the CNNSI website. For each document, the index information indicates an URL 402 which can be used to access the document, a list of topics, subjects, concepts 404 to which the document relates, and a title 406 of the document. The topic/subject/concept information for a document comprises information related to the contents of the document. For example, URL "sportsillustrated.cnn.com/baseball/mlb/news/2001/05/07/cordova_indians_ap" can be used to access a document titled "Cordova flourishing in potent Cleveland lineup" which contains information related to concepts/topics "Cleveland Indians" and "Major League Baseball". User system 102 can process this index information to find documents that might be of interest to the user. It should be apparent that the index information received by user system 102 may be in various other formats and may contain more or less information than the portion of the index information depicted in FIG. 4.

Referring back to FIG. 3, at step 308, user system 102 receives index information communicated either from index server 106 or from one or more web servers 104 (step 308). The index information received by user system 102 is then used to identify web pages of interest to the user on the user system (step 310). Various different techniques may be used to identify web pages of interest to or relevant to the user using the index information received in step 308. According to the teachings of the present invention, for each of the identification techniques, the entire processing for identifying web pages of interest to the user is performed on user system 102 itself, substantially free from any interaction with web servers 104 and index server 106. Unlike conventional search engines, the user does not have to provide search queries or other information to remote search engine servers where the information may be mined and/or tracked. Since all identification operations are performed locally on user system 102, the user has complete control over the type of information which can be tracked during the identification process, and also has complete control over the distribution of the information. The user's privacy is thus preserved as user-related information cannot be tracked/mined or distributed from user system 102 without the user's authorization.

Since relevant web pages are identified based on index information which is locally stored on user system 102, user system 102 does not have to be connected to communication network 108 during the identification process, i.e. the index information received by user system 102 can be searched and web pages of interest to the user can be identified in an offline manner. This is substantially different from conventional web page identification techniques using search engines executing on remote servers which require that the user system have a network connection to the server executing the search engine in order for the search to be performed and relevant web pages identified. Local access to the index information also increases the speed of the identification process as compared to conventional network-based search techniques which are usually executed on remote servers.

As indicated above, various different techniques may be used to identify web pages of interest to or relevant to the user using the index information received in step 308. According to an embodiment of the present invention, a localized search engine is provided to facilitate the identification of relevant documents (web pages). The localized search engine executes on user system 102. The localized search engine is configured to accept a search query from the user, and search the index information to identify URLs corresponding to web pages which satisfy or are relevant to the search query. According to an embodiment of the present invention, the localized search engine may be coupled to a browser program executing on user system 102 and receive the search query via the browser. URLs identified by the localized search engine may be presented to the user using the browser interface.

The user query may contain query terms which describe, for example, a topic or concept for which the user is interested in finding more information. For example, if the user is interested in finding information on Thai cooking, the query terms may include the words "Thai" and "cooking." In response to the query, the localized search engine is configured to identify URLs corresponding to web pages related to Thai cooking. Various different comparison and search techniques may be used by the localized search engine to search the index information to identify documents relevant to the user query. The documents identified by the localized search engine may be presented to the user via an output device coupled to user system 102.

According to the teachings of the present invention, the localized search engine executes locally on user system 102 and uses index information received from index server 106 or from web servers 104 and which is stored locally by user system 102. Thus, unlike conventional search techniques, the user query is not communicated to a remote search engine server where the information contained in the query may be mined or tracked by the server. Since all operations are performed on user system 102, the user has complete control on the type of information, if any, which is tracked/stored by the localized search engine. The user also has complete control over the distribution of information, if any, tracked by the localized search engine. The user's privacy is thus preserved as user-related information cannot be tracked/mined or distributed from user system 102 without the user's authorization.

According to another embodiment of the present invention, documents (e.g. web pages) relevant to the user may be automatically identified based upon the index information received from index server 106 or from web servers 104 and based upon user-related information which may be stored (e.g. a user profile) by user system 102. The user profile may include information about a user's likes/dislikes, preferences, commonly visited web pages, concepts or topics of interest to the user, and other information related to the user or the user's browsing behavior. An "automated document selector" module may be provided which executes on user system 102 and identifies documents or web pages (identified by URLs) of potential interest to the user based upon user information accessible via user system 102 (e.g., user information stored in a user profile file). The URLs corresponding to web pages identified to be of potential interest to the user may be presented to the user via an output device coupled to user system 102. Like with the other document identification techniques, according to the present invention, the processing performed to automatically identify relevant web pages is performed locally on user system 102. The user thus has complete control over the type of information which is stored by the identification techniques and over the dissemination of the information. This in turn preserves the privacy and security of the user.

The user profile information may have been collected using various techniques. Examples of techniques for collecting user information and generating user profiles are described in U.S. patent application Ser. No. 09/510,902 entitled "METHOD FOR CREATING USER PROFILES", U.S. patent application Ser. No. 09/511,034, entitled "SYSTEM FOR CREATING USER PROFILES", and U.S. patent application Ser. No. 09/510,904, entitled "COMPUTER PROGRAM FOR CREATING USER PROFILES", (all currently pending), the entire disclosures of which are herein incorporated by reference for all purposes.

According to an embodiment of the present invention, the localized search engine described above may also be used to collect user information which may be used for building a user profile. The localized search engine may provide a user-configurable option which when selected by the user enables the localized search engine to mine the query information provided by the user to the localized search engine. The information mined by the localized search engine may then be used to build or augment the user profile information stored by user system 102. Since the mining/tracking of information is user-configurable and performed locally on user system 102, the user can control when and what type of information is mined by the localized search engine. Further, since the mined information is stored locally on the user system, the user has complete control over the distribution/communication of the tracked information. The privacy of user information is thus not compromised.

Various other techniques may also be used to identify web pages and other documents of interest to the user based upon index information received from index server 106 and/or from web servers 104.

Referring back to FIG. 3, the user may then select and access one or more web pages or documents from the web pages/documents identified in step 310 (step 312). For example, the user may select a URL identified in step 310 and access the web page corresponding to the URL from a web server storing the corresponding web page. In this manner, the present invention enables the user to identify and access web pages and other documents of interest to the user.

In a specific embodiment, the present invention also provides techniques for ensuring that the web server from which a web page is accessed in step 312 does not track information from the user system. For example, web pages accessed by the user in step 312 may have "cookies" associated with them. A "cookie" is a mechanism that allows the web server storing the web page to collect information about a user who accesses the web page. A cookie is usually transmitted to user system 102 along with a web page accessed by the user and is configured to collect information about the user, e.g. information related to the user's interaction with the accessed web page(s). The information collected by a cookie may be stored on user computer 102 or may be transmitted back to the web server. Since cookies generally collect information without the user's knowledge or authorization, the collection and dissemination of that information constitutes a breach of the user's privacy.

In order to prevent such breaches of privacy, according to an embodiment of the present invention, an "audit module" is provided which executes on user system 102 and ensures that information about the user is not tracked or monitored on user system 102, or communicated to external computer systems, including web servers 104 and index server 106 by using techniques such as cookies, without the user's authorization. The audit module includes a "sniffer" that monitors the presence of cookies and also monitors information being transmitted from user computer 102 to external entities. If the audit module detects that information related to the user is being tracked or communicated without the user's permission, the user is notified of such a condition.

Examples of violating conditions may include the presence of a cookie associated with a web page, communication of user information from the user system to a web server or to the index server, tracking/mining of user information without the user's authorization, etc. The user may be notified about the violating condition via an audio alarm, a flashing graphical user indication (e.g., a flashing icon), a streaming audio/video message, an email, audio output, video output, combinations of the aforementioned techniques, and the like. The audit module may then allow the user to remove the violating condition. For example, the audit module may allow the user to delete cookies associated with web pages accessed by the user, or provide a filter which automatically deletes cookies associated with any web page accessed by the user. In this manner, the audit module enables the user to preserve the privacy of user-related information. In a specific configuration, the audit module may be programmed to automatically prevent the monitoring and communication of any user related information by an external computer entity from user system 102.

In alternative embodiments of the present invention, an audit server coupled to one or more user systems 102 may be provided to perform the tasks performed by an audit module. In this embodiment, the audit server sniffer ensures that the information going back to the web server from any user system is the same, regardless of the user system, i.e., each user system will send back an acknowledgment packet, which indicates that the index information has been received. Each user system may also send back its IP address. In preferred embodiments, there is substantially no other information that is sent from a user system 102 to the web server. Any other information may be tagged as a violating condition. The sniffer monitors the user system activity to make sure that information from the user system is not being communicated to the index server. The audit server is used only to verify that the privacy of the user is being maintained and is not an essential part of the system described in this invention.

Figure 5:
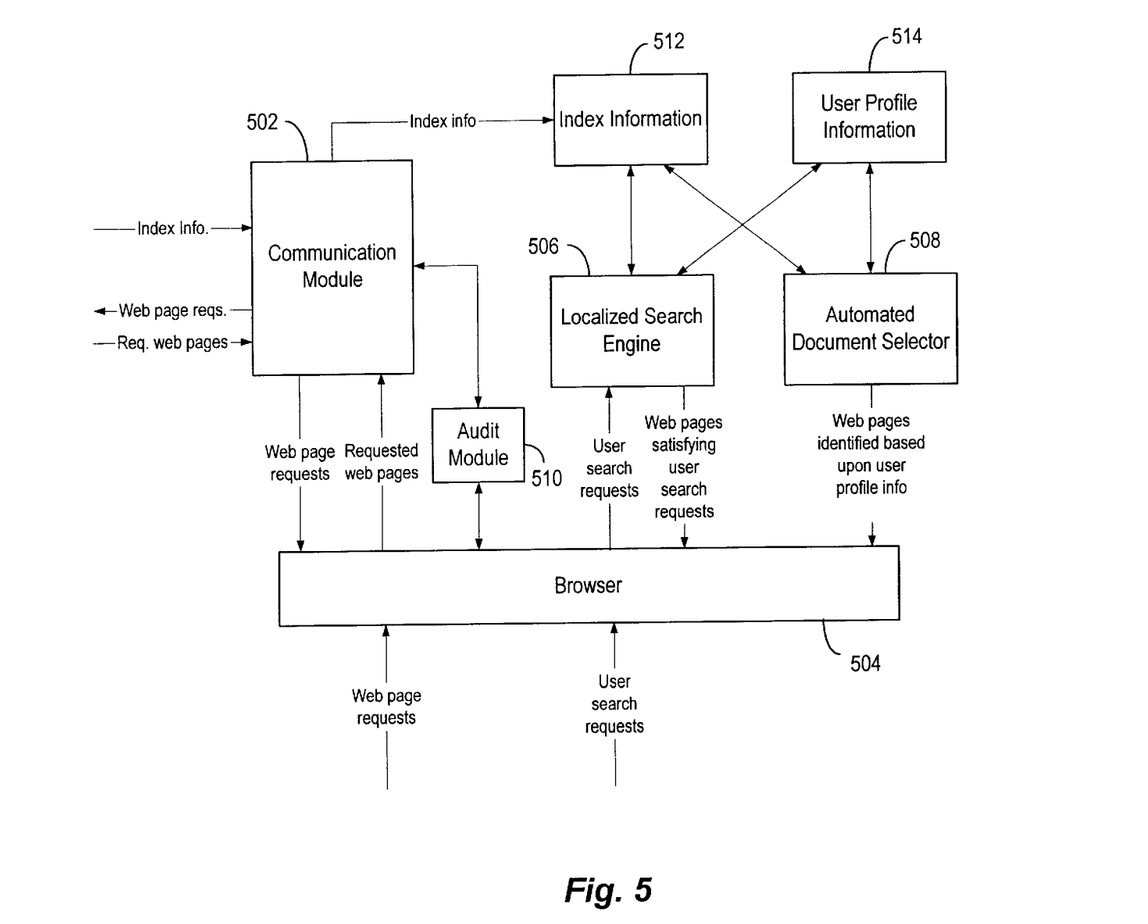
FIG. 5 depicts information stored by a user system and modules which are executed by the user system to provide features according to an embodiment of the present invention.

FIG. 5 depicts information stored by user system 102 and modules which are executed by user system 102 to provide features according to an embodiment of the present invention. Although FIG. 5 and the associated description describes modules for identifying and accessing web pages of interest to the user, it should be apparent that the modules can also be used to identify and access other types of documents such as documents created using application programs such as word processors, communication programs, etc. The modules and information depicted in FIG. 5 are merely illustrative of an embodiment incorporating the present invention and do not limit the scope of the invention as recited in the claims. One of ordinary skill in the art would recognize other variations, modifications, and alternatives. For example, in alternative embodiments of the present invention, one or more of the modules depicted in FIG. 5 may be combined into a single module, and/or a single module depicted in FIG. 5 may be broken down into several modules. The modules depicted in FIG. 5 may be implemented in software or hardware, or combinations thereof. The software modules are executed by the processor of user system 102.

According to an embodiment of the present invention, the modules depicted in FIG. 5 include a browser program module 504, a localized search engine module 506, an automated document selector module 508, an audit module 510, and a communication module 502. The information stored by user system 102 may include index information 512 and user profile information 514. Index information 512 contains information related to documents hosted by computer systems in a network environment. As described above, index information 512 is received from index server 106 or from web servers 104 which provide search engines. User profile information 804 comprises information related to the user's preferences, likes/dislikes, etc. The information is generally stored in the storage subsystem of user system 102.

According to an embodiment of the present invention, communication module 502 is configured to facilitate communication of information and data to and from user system 102. Communication module 1302 may receive web page requests from the various modules of user system 102 and forward the requests to web servers. In response to the web page request, communication module 502 may receive web pages from the web servers storing the requested web pages. Communication module 502 may forward the web pages to browser 504 to be output to the user. In specific embodiments of the present invention, communication module 502 may also receive requests (not shown in FIG. 5) to download index information from index server 106. Communication module 502 may communicate these requests to index server 106.

Communication module 502 also receive index information either from index server 106 or from web servers 104. Communication module 502 may store the index information in the storage subsystem of user system 102 or may alternatively forward the information to appropriate modules of user system 102. Communication of other information to and from user system 102 may also be handled by communication module 502.

As described above, browser program 504 enables a user to select, retrieve, and access web pages. Examples of browsers include the Internet Explorer browser program provided by Microsoft Corporation, and the Netscape Navigator browser provided by Netscape Corporation, and others. A user generally accesses a web page by providing URL information corresponding to the web page to browser 504, either directly or indirectly. Browser 504 communicates the URL web page request to communication module 502 which communicates the request to a web server storing the requested web page. The requested web page corresponding to the user-provided URL received by user system 102 from the web server can then be displayed to the requesting user via browser 504.

According to an embodiment of the present invention, the user may also provide search requests to localized search engine 506 via browser 504. Browser 504 may be configured to receive URLs from localized search engine 506 in response to the search requests, and to output the URLs to the user. The user may then select a URL from the list of URLs provided by localized search engine 506 and access a web page corresponding to the selected URL via browser 504.

According to an embodiment of the present invention, localized search engine 506 is configured to identify web pages of interest to the user based upon index information 512 received by user system 102 and based upon search queries received from the user describing topics or concepts of interest to the user and for which the user is interested in finding relevant web pages. As shown in FIG. 5, localized search engine 506 may receive the user search queries via browser 504. In alternative embodiments of the present invention, localized search engine may receive search queries directly from the user, e.g., via an user interface provided by the localized search engine. Upon receiving a user query, localized search engine 506 searches index information 512 to identify relevant web pages (identified by URLs) which satisfy the search query. The list of URLs corresponding to the relevant web pages is provided to the user via browser 504. As described above, the user may then select one or more URLs from the list of URLs identified by localized search engine 506 and access web pages corresponding to the selected URLs.

As previously described, according to an embodiment of the present invention, localized search engine 506 may also track and/or mine information contained in the search queries provided by the user to the localized search engine. The option to mine user query information is user-configurable. The information mined by localized search engine 506 may be used to build or augment user profile information 514 which may be stored in the storage subsystem of user system 102.

According to an embodiment of the present invention, automated document selector module 508 is configured to automatically identify web pages of interest to the user based upon user profile information 514 and index information 512. Web pages (identified by URLs) identified by automated document selector module 508 to be of interest to the user may be output to the user via browser 504. The user may then select one or more URLs from the list of URLs identified by automated document selector module 508 and access web pages corresponding to the selected URLs.

According to an embodiment of the present invention, audit module 510 prevents unauthorized monitoring and communication of information related to the user or to the user's browsing activities from user system 102. For example, audit module 510, in cooperation with browser 504, tracks the presence of cookies associated with web pages accessed by the user via browser 504. If audit module 510 detects a cookie, the user is notified of the cookie and provided an option to delete the cookie. Audit module 510, in cooperation with communication module 502, also monitors information communicated to and from user system 102 to prevent communication of user-related information to index server 106 or to web servers 104 without the user's permission.

As described above, the present invention enables a user to identify and access documents stored in a network environment without compromising user privacy. Instead of using remote search engine servers which can mine user information to identify documents of interest to the user, the present invention identifies the relevant documents based upon index information received by user system 102. Since the process of identifying relevant documents is performed locally on user system 102 using index information locally stored on user system 102, remote servers such as index server 106 and web server 104 do not have to receive any information (e.g. search queries, etc.) related to the user which can be mined to build user profiles. Accordingly, the identification of documents of interest to the user is performed by the user system substantially free from any interactions with other computer systems coupled to communication network 108. The local search also obviates the need to use remote search engines which can track both query information and information about web pages accessed by the user using the remote search engine. The present invention also ensures that user-related information is not tracked by web servers via mechanisms such as cookies. The user's privacy is thus preserved as user-related information cannot be tracked/mined or accessed by any computer system remote from the user system 102 without the user's authorization. User privacy and security is consequently preserved.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a network environment comprising a user system, an index server, and a plurality of web servers storing a plurality of documents, a method of accessing a first document from the plurality of documents using the user system, the method comprising:

determining, at the index server, index information to be communicated to the user system, the index information comprising information identifying the plurality of documents stored by the plurality of web servers and information related to the contents of the plurality of documents;

communicating the index information from the index server to the user system; and at the user system:

identifying a first set of documents from the plurality of documents using the index information received from the index server, the first set of documents including the first document, wherein the first set of documents is identified substantially free from interaction with the index server and the plurality of web servers;

receiving a signal indicating selection of the first document from the first set of documents; and responsive to the signal, accessing the selected first document from a web server storing the first document.

2. The method of claim 1 wherein determining, at the index server, index information to be communicated to the user system comprises:

at the index server:

for each document in the plurality of documents:

determining information identifying the document;

determining information identifying a web server storing the document; and determining information related to the contents of the document; and generating the index information based upon the information identifying the plurality of documents, the information identifying web servers storing the plurality of documents, and the information related to the contents of the plurality of documents.

3. The method of claim 2 wherein generating the index information comprises:
   at the index server:
      accessing a first set of criteria;
      from the information identifying the plurality of documents, the information identifying web servers storing the plurality of documents, and the information related to the contents of the plurality of documents, determining information which satisfies the first set of criteria; and
      generating the index information based upon the information which satisfies the first set of criteria.

4. The method of claim 1 wherein determining, at the index server, index information to be communicated to the user system comprises:
   at the index server:
      receiving first index information from a first server providing a first search engine, the first index information comprising information related to documents from the plurality of documents which can be identified using the first search engine; and
      configuring the index information to be communicated to the user system based upon the first index information.

5. The method of claim 1 wherein determining, at the index server, index information to be communicated to the user system comprises:
   at the index server:
      receiving first index information from a first server providing a first search engine, the first index information comprising information related to documents from the plurality of documents which can be identified using the first search engine;
      receiving second index information from a second server providing a second search engine, the second index information comprising information related to documents from the plurality of documents which can be identified using the second search engine; and
      configuring the index information to be communicated to the user system based upon the first index information and the second index information.

6. The method of claim 5 wherein configuring the index information to be communicated to the user system comprises combining the first index information and the second index information to generate the index information.

7. The method of claim 1 wherein identifying, at the user system, the first set of documents from the plurality of documents using the index information received from the index server comprises:
   at the user system:
      receiving a search query;
      responsive to receiving the search query, searching the index information to identify documents from the plurality of documents which satisfy the search query; and
      including the documents which satisfy the search query in the first set of documents.

8. The method of claim 1 wherein identifying, at the user system, the first set of documents from the plurality of documents using the index information received from the index server comprises:
   at the user system:
      accessing information related to a user of the user system;
      searching the index information to identify documents from the plurality of documents based upon the information related to the user of the user system; and
      including the documents identified based upon the information related to the user of the user system in the first set of documents.

9. The method of claim 1 wherein:
   the plurality of documents stored by the plurality of web servers are a plurality of web pages, and the first set of documents includes a first set of web pages from the plurality of web pages;
   identifying, at the user system, the first set of documents from the plurality of documents using the index information received from the index server comprises identifying a first set URLs corresponding to the first set of web pages;
   receiving a signal indicating selection of the first document comprises receiving a signal indicating selection of a first URL from the first set of URLs; and
   accessing the selected first document comprises accessing a web page corresponding to the selected first URL.

10. The method of claim 1 wherein accessing the selected first document comprises:
   determining if the web server storing the first document is tracking information from the user system; and
   if the web server storing the first document is tracking information from the user system, preventing the web server from tracking the information from the user system.

11. The method of claim 10 wherein determining if the web server storing the first document is tracking information from the user system comprises:
   determining if a cookie is associated with the first document accessed using the user system.

12. A method of accessing a first document from the plurality of documents stored by a plurality of servers using a user system, the method comprising:
   at the user system:
      receiving index information from an index server, the index information comprising information identifying the plurality of documents stored by the plurality of servers and information related to the contents of the plurality of documents;
      identifying a first set of documents from the plurality of documents using the index information received from the index server, the first set of documents including the first document, wherein the first set of documents is identified substantially free from interaction with the index server and the plurality of servers;
      receiving a signal indicating selection of the first document from the first set of documents; and
      responsive to the signal, accessing the selected first document from a server storing the first document.

13. The method of claim 12 wherein the index information received by the user system comprises information for the plurality of documents collected by the index server, the information collected by the index server comprising information identifying the plurality of documents, information identifying servers storing the plurality of documents, and information related to the contents of the plurality of documents.

14. The method of claim 12 wherein receiving index information from the index server comprises:
   communicating a first set of criteria from the user system to the index server; and
   wherein the index information received by the user system from the index server comprises information satisfying the first set of criteria.

15. The method of claim 12 wherein the index information received by the user system comprises first index information communicated by a first server providing a first search engine to the index server, and second index information communicated by a second server providing a second search engine to the index server,
  wherein the first index information comprises information identifying documents from the plurality of documents which can be identified using the first search engine; and
  wherein the second index information comprises information identifying documents from the plurality of documents which can be identified using the second search engine.

16. The method of claim 12 wherein identifying the first set of documents from the plurality of documents using the index information received from the index server comprises:
  at the user system:
    receiving a search query;
    responsive to receiving the search query, searching the index information to identify documents from the plurality of documents which satisfy the search query; and
    including the documents which satisfy the search query in the first set of documents.

17. The method of claim 12 wherein identifying the first set of documents from the plurality of documents using the index information received from the index server comprises:
  at the user system:
    accessing information related to a user of the user system;
    searching the index information to identify documents from the plurality of documents based upon the information related to the user of the user system; and
    including the documents identified based upon the information related to the user of the user system in the first set of documents.

18. The method of claim 12 wherein:
  the plurality of documents stored by the plurality of servers are a plurality of web pages, and the first set of documents includes a first set of web pages from the plurality of web pages;
  identifying the first set of documents from the plurality of documents using the index information received from the index server comprises identifying a first set URLs corresponding to the first set of web pages;
  receiving a signal indicating selection of the first document comprises receiving a signal indicating selection of a first URL from the first set of URLs; and
  accessing the selected first document comprises accessing a web page corresponding to the selected first URL.

19. The method of claim 12 wherein accessing the selected first document comprises:
  determining if the server storing the first document is tracking information from the user system; and
  if the server storing the first document is tracking information from the user system, preventing the server from tracking information from the user system.

20. The method of claim 19 wherein determining if the server storing the first document is tracking information from the user system comprises:
  determining if a cookie is associated with the first document accessed using the user system.

21. A computer program product stored on a computer-readable storage medium for accessing a first document using a user system from a plurality of documents stored in a network environment, the computer program product comprising:
  code for receiving index information from an index server, the index information comprising information identifying the plurality of documents, information related to contents of the plurality of documents, and information identifying servers storing the plurality of documents;
  code for identifying a first set of documents from the plurality of documents using the index information received from the index server, the first set of documents including the first document, wherein the first set of documents is identified substantially free from interaction with the index server and the servers storing the plurality of documents;
  code for receiving a signal indicating selection of the first document from the first set of documents; and
  responsive to the signal, code for accessing the selected first document from a server storing the first document.

22. The computer program product of claim 21 wherein the code for receiving index information from the index server comprises:
  code for communicating a first set of criteria from the user system to the index server; and
  wherein the index information received by the user system from the index server comprises information satisfying the first set of criteria.

23. The computer program product of claim 21 wherein the code for identifying the first set of documents from the plurality of documents using the index information received from the index server comprises:
  code for receiving a search query;
  responsive to receiving the search query, code for searching the index information to identify documents from the plurality of documents which satisfy the search query; and
  code for including the documents which satisfy the search query in the first set of documents.

24. The computer program product of claim 21 wherein the code for identifying the first set of documents from the plurality of documents using the index information received from the index server comprises:
  code for accessing information related to a user of the user system;
  code for searching the index information to identify documents from the plurality of documents based upon the information related to the user of the user system; and
  code for including the documents identified based upon the information related to the user of the user system in the first set of documents.

25. The computer program product of claim 21 the code for accessing the selected first document comprises:
  code for determining if the server storing the first document is tracking information from the user system; and
  if the server storing the first document is tracking information from the user system, code for preventing the server from tracking information from the user system.

26. A system for accessing information comprising:
  a communication network;
  a plurality of web server systems coupled to the communication network, the plurality of web server systems configured to store a plurality of documents, the plurality of documents including a first document;

an index server system coupled to the communication network; and a user system;

wherein the index server system is configured to determine index information to be communicated to the user system, the index information comprising information identifying the plurality of documents stored by the plurality of web server systems and information related to the contents of the plurality of documents;

wherein the index server system is configured to communicate the index information to the user system; and wherein the user system is configured to:
    identify a first set of documents from the plurality of documents using the index information received from the index server system, the first set of documents including the first document, the identification of the first set of documents being performed substantially free from interaction with the index server system and the plurality of web server systems;
    receive a signal indicating selection of the first document from the first set of documents; and
    in response to the signal, access the selected first document from a web server storing the first document.

27. The system of claim 26 wherein to determine the index information to be communicated to the user system, the index server system is configured to:
    for each document in the plurality of documents:
        determine information identifying the document;
        determine information identifying a web server storing the document; and
        determine information related to the contents of the document; and
    configure the index information based upon the information identifying the plurality of documents, the information identifying web servers storing the plurality of documents, and the information related to the contents of the plurality of documents.

28. The system of claim 27 wherein to configure the index information, the index server system is configured to:
    access a first set of criteria;
    from the information identifying the plurality of documents, the information identifying web servers storing the plurality of documents, and the information related to the contents of the plurality of documents, determine information which satisfies the first set of criteria; and
    generate the index information based upon the information which satisfies the first set of criteria.

29. The system of claim 26 wherein to determine the index information to be communicated to the user system, the index server system is configured to:
    receive first index information from a first server providing a first search engine, the first index information comprising information related to documents from the plurality of documents which can be identified using the first search engine; and
    configure the index information to be communicated to the user system based upon the first index information.

30. The system of claim 26 wherein to determine the index information to be communicated to the user system, the index server system is configured to:
    receive first index information from a first server providing a first search engine, the first index information comprising information related to documents from the plurality of documents which can be identified using the first search engine;
    receive second index information from a second server providing a second search engine, the second index information comprising information related to documents from the plurality of documents which can be identified using the second search engine; and
    configure the index information to be communicated to the user system based upon the first index information and the second index information.

31. The system of claim 30 wherein to configure the index information to be communicated to the user system, the index server system is configured to combine the first index information and the second index information to generate the index information.

32. The system of claim 26 wherein to identify the first set of documents from the plurality of documents using the index information received from the index server system, the user system is configured to:
    receive a search query;
    responsive to receiving the search query, search the index information to identify documents from the plurality of documents which satisfy the search query; and
    include the documents which satisfy the search query in the first set of documents.

33. The system of claim 26 wherein to identify the first set of documents from the plurality of documents using the index information received from the index server system, the user system is configured to:
    access information related to a user of the user system;
    search the index information to identify documents from the plurality of documents based upon the information related to the user of the user system; and
    include the documents identified based upon the information related to the user of the user system in the first set of documents.

34. The system of claim 26 wherein:
    the plurality of documents stored by the plurality of web server systems are a plurality of web pages, and the first set of documents includes a first set of web pages from the plurality of web pages;
    to identify the first set of documents from the plurality of documents using the index information received from the index server system, the user system is configured to identify a first set URLs corresponding to the first set of web pages;
    to receive a signal indicating selection of the first document, the user system is configured to receive a signal indicating selection of a first URL from the first set of URLs; and
    to access the selected first document, the user system is configured to access a web page corresponding to the selected first URL.

35. The system of claim 26 wherein to access the selected first document, the user system is configured to:
    determine if the web server storing the first document is tracking information from the user system; and
    if the web server storing the first document is tracking information from the user system, prevent the web server from tracking information from the user system.

36. The system of claim 35 wherein to determine if the web server storing the first document is tracking information from the user system, the user system is configured to determine if a cookie is associated with the first document accessed from the web server.

37. A data processing system for accessing a first document from a plurality of documents stored by a plurality of servers, the data processing system comprising:

a processor;

a memory coupled to the processor, the memory configured to store a plurality of code modules for execution by the processor, the plurality of code modules comprising:

code for receiving index information from an index server, the index information comprising information identifying the plurality of documents stored by the plurality of servers and information related to the contents of the plurality of documents;

code for identifying a first set of documents from the plurality of documents using the index information received from the index server, the first set of documents including the first document, wherein the first set of documents is identified substantially free from interaction with the index server and the plurality of servers;

code for receiving a signal indicating selection of the first document from the first set of documents; and responsive to the signal, code for accessing the selected first document from a server storing the first document.

38. The system of claim 37 wherein the index information received by the data processing system comprises information for the plurality of documents collected by the index server, the information collected by the index server comprising information identifying the plurality of documents, information identifying servers storing the plurality of documents, and information related to the contents of the plurality of documents.

39. The system of claim 37 wherein the code for receiving index information from the index server comprises:

code for communicating a first set of criteria from the data processing system to the index server;

wherein the index information received by the data processing system from the index server comprises information satisfying the first set of criteria.

40. The system of claim 37 wherein the index information received by the data processing system comprises first index information communicated by a first server providing a first search engine to the index server, and second index information communicated by a second server providing a second search engine to the index server, wherein the first index information comprises information identifying documents from the plurality of documents which can be identified using the first search engine; and wherein the second index information comprises information identifying documents from the plurality of documents which can be identified using the second search engine.

41. The system of claim 37 wherein the code for identifying the first set of documents from the plurality of documents using the index information received from the index server comprises:

code for receiving a search query;

responsive to receiving the search query, code for searching the index information to identify documents from the plurality of documents which satisfy the search query; and code for including the documents which satisfy the search query in the first set of documents.

42. The system of claim 37 wherein the code for identifying the first set of documents from the plurality of documents using the index information received from the index server comprises:

code for accessing information related to a user of the data processing system;

code for searching the index information to identify documents from the plurality of documents based upon the information related to the user of the data processing system; and code for including the documents identified based upon the information related to the user of the data processing system in the first set of documents.

43. The system of claim 37 wherein:

the plurality of documents stored by the plurality of servers are a plurality of web pages, and the first set of documents includes a first set of web pages from the plurality of web pages;

the code for identifying the first set of documents from the plurality of documents using the index information received from the index server comprises code for identifying a first set URLs corresponding to the first set of web pages;

the code for receiving a signal indicating selection of the first document comprises code for receiving a signal indicating selection of a first URL from the first set of URLs; and the code for accessing the selected first document comprises code for accessing a web page corresponding to the selected first URL.

44. The system of claim 37 wherein the code for accessing the selected first document comprises:

code for determining if the server storing the first document is tracking information from the data processing system; and if the server storing the first document is tracking information from the data processing system, code for preventing the server from tracking information from the data processing system.

45. The system of claim 44 wherein the code for determining if the server storing the first document is tracking information from the data processing system comprises code for determining if a cookie is associated with the first document accessed using the data processing system.

* * * * *